Estes & Dutcher.
Spinning Throstle.
Nº 1,259.    Patented Jul. 26, 1839.
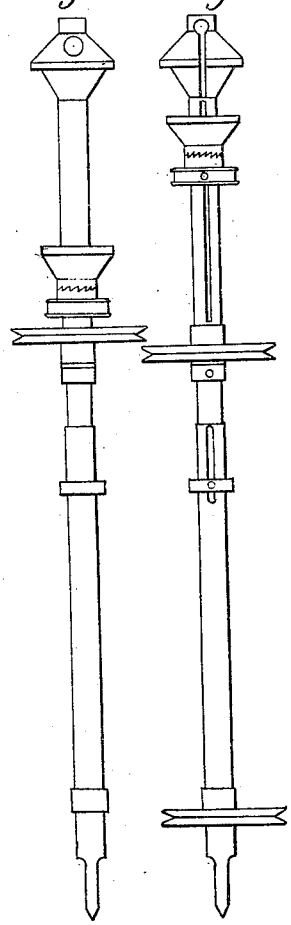
Fig. 1.  Fig. 2.
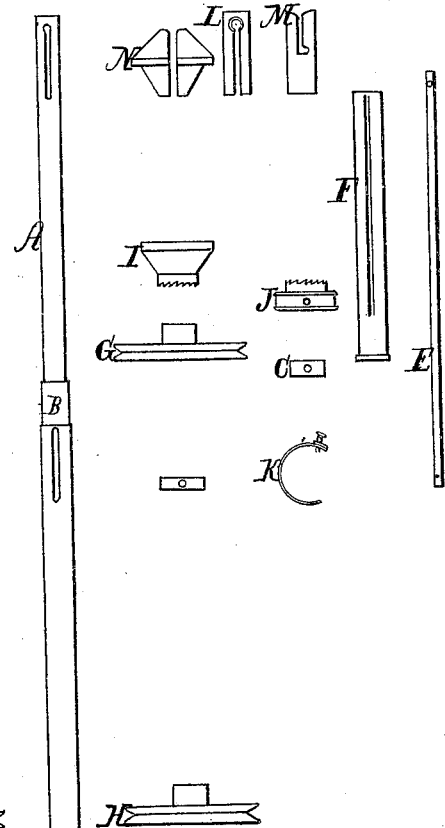
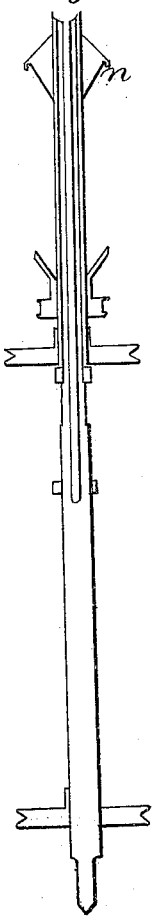
Fig. 3.

UNITED STATES PATENT OFFICE.

TRUMAN ESTES AND W. DUTCHER, OF BENNINGTON, VERMONT.

COP-SPEEDER.

Specification of Letters Patent No. 1,259, dated July 26, 1839.

*To all whom it may concern:*

Be it known that we, TRUMAN ESTES and WARREN DUTCHER, of Bennington, in the county of Bennington and State of Vermont, have invented a new and useful Machine, known by the name of the "Cop-Speeder," for Making Twisted Cotton Roving; and we do hereby declare that the following is a full and exact description of the spindle and its separate parts, together with its operation.

The nature of our invention consists principally in the construction and combination of the spindle together with its several parts each having a distinct use in the operation.

The spindle as shown at A, in the accompanying drawing, is about 28 inches in length and about $\frac{3}{4}$ of an inch in diameter from the step up to the collar or bearing, and about $\frac{5}{8}$ of an inch in diameter from the bearing up to the top of spindle, and about 11 inches in length from the bearing up to the top of the spindle. The collar is about one inch in diameter, $1\frac{1}{4}$ of an inch in length and made of brass and a hole through its center about $\frac{5}{8}$ and $\frac{1}{16}$ of an inch in diameter and is slipped onto the bearing of the spindle as shown at B to support the spindle. There is a small steel or iron collar slipped onto the spindle down within $\frac{1}{4}$ of an inch of the collar or bearing as shown at C. It is about $\frac{3}{8}$ of an inch in length and $\frac{1}{4}$ of an inch thick and is made fast to the spindle by a set screw that is screwed through said collar. This collar holds up the cap sheath. There is a hole drilled into the spindle $\frac{1}{4}$ of an inch in diameter, commencing at the top and continues about 2 inches below the bearing B, making the hole about 15 inches in length. There is also a slit cut through into the drilled hole in the spindle on one side below the bearing about 2 inches in length and $\frac{1}{8}$ wide. There is a traverse ring or ferrule placed around the spindle where the slit is cut through. This ring as shown at D is about $\frac{3}{4}$ of an inch in length and $\frac{1}{4}$ of an inch thick. There is a small screw screwed through this traverse ring passing through the slit in the spindle, and enters into a small hole in a wire traverse rod near the lower end, as shown at E. This traverse rod nearly fills the drilled hole in the spindle. It is about 13 inches in length and has an eye or hole drilled down into the top end about $\frac{1}{4}$ of an inch deep, and then comes out on one side. This eye is to guide the roving. There is a hole drilled through one side of the spindle within $\frac{1}{4}$ of an inch of the top and $\frac{1}{4}$ of an inch in diameter. A slit is cut from said hole in the spindle downward about 2 inches in length, and about $\frac{1}{8}$ of an inch wide, and is cut through into the drilled hole in the spindle. The object of this slit is to let the roving pass through and traverse up and down as will be hereinafter shown, the hole at the upper end which is connected into the slit and is for convenience about putting through an end of roving.

The spindles when placed in a frame will stand within $3\frac{1}{2}$ inches of each other. Still the pulleys H are four inches in diameter, having a hub on one end. They are placed on the spindles with one-half of the hubs up and the other half down, making the pulleys to lap by each other. We do this in order that the bands may have larger surfaces to run on; hence it makes a more perfect motion on the spindles.

The roving sheath F is what the roving slips onto as it forms into a cop; it is about 8 inches in length and $\frac{3}{4}$ and $\frac{1}{16}$ of an inch in diameter with a hole through its center $\frac{5}{8}$ of an inch in diameter and is slipped onto the spindle above the bearing and is held up by the steel collar C, before mentioned.

There is a pulley G made fast on the roving sheath near the bottom. This pulley is of the same size as that of the spindle pulley and is placed as in the same order as the spindle pulleys are. There is a groove on one side of the cop sheath from the pulley up within $\frac{1}{4}$ of an inch of the top; it is $\frac{1}{8}$ of an inch wide and $\frac{1}{16}$ of an inch deep. This groove and sheath also is polished perfectly smooth, so that the cop may slip down as it is formed under the former. There is placed on this sheath a slide cup I. This cup may be made of wood, iron, or brass. It is composed of two parts. The cup I is the flaring part, and the hub J on which the cup rests. The hub is about $\frac{3}{4}$ of an inch in length with teeth on the upper end; it is about one inch in diameter at the upper end where the teeth are; below the teeth there is a swell to the rise of $1\frac{1}{2}$ inches in diameter, with a score turned down in its surface about $\frac{1}{8}$ of an inch deep and $\frac{1}{4}$ of an inch wide. There is a steel spring K $\frac{1}{4}$ of an inch wide, and $\frac{1}{32}$ of an inch thick, and is bent on a circle sufficient to fit or lie into the before mentioned score on the hub. This spring reaches a little more than $\frac{1}{2}$ of the way around said hub. By this means the spring cannot get off of said hub. At one end of the spring it is made a little thicker that the erect part of it. There is a small screw screwed through this end of the spring, with the point of the screw bearing onto a small hard wood plug that is placed in a hole which is made in one side of the hub under the spring, which plug passes through a hole ¼ of an inch in diameter and the other end of said wooden plug bears into the before-mentioned groove on the cop sheath. This plug prevents the hub from turning around on the cop sheath; by turning the screw in or out determines the stiffness of the spring, and makes the hub to slide tighter or looser on the cop sheath. By this means the cop may be condensed tighter or looser, just as occasion may require.

The cup I before mentioned is about 1½ inches in length and 2¼ inches in diameter at the top and one inch in diameter at the lower end, with teeth on the bottom to fit into the teeth on the top of the hub. These teeth prevent the cup from turning faster than the hub. The cup is open at the top, flaring on an angle of about 50 degrees, and about $\frac{1}{12}$ of an inch thick. The interior size at the top is 2¼ inches in diameter; the smallest interior size at the bottom is ¾ and $\frac{1}{16}$ of an inch, being the same size as that of the cop sheath on which the cup is placed. The perpendicular length of the interior flaring part is one inch, hence it requires the traverse to move vertically up and down 1⅝ of an inch in order to lay the roving from the largest to the smallest place in the flaring part of the cup.

As the cop sheath before mentioned is placed on the spindle there is 2½ inches of the spindle above the sheath. There is then an iron ferrule, as shown at L, M, by a view on two sides, on that portion of the spindle above the sheath 2¼ inches in length and of the same size or diameter as that of the cop sheath and is made fast to the spindle, having a slit cut through on one side of the ferrule of the same size as the one before described on the top of the spindle. It is also placed on the spindle so that the two slits come together on one side of the spindle. This is done in order that the roving may pass through both slits from the center of the spindle outward. The slit is not sawed clear out at the bottom. There is a thin portion left in order that the roving shall not get in between the ends of the ferrule and cop sheath. There is another slit on this ferrule opposite to the before mentioned slit, commencing at the top of the ferrule and continues down about one inch and then turns to the right ⅛ of an inch. This slit is to hold the former, as will be hereinafter described. This ferrule when placed on the spindle prevents the cop sheath from rising up when the cop is taken off; also when the former is taken off to get the cop off the roving or cop raised up, and by this ferrule being placed on the spindle, being of the same diameter as the cop sheath, and being perfectly smooth, the roving is slipped off over the ferrule, passing over the joint between the bottom of the ferrule and the top end of the roving sheath, as said sheath and ferrule being so nearly closed together that no roving can get between them, neither when the machine is in operation, or in doffing.

The former as shown at N is what we shall next describe. It is the most important part of this combination. The former is made of cast iron, although it may be made of brass; it is about 2 inches in length, and has a hole through its center about ¾ and $\frac{1}{16}$ of an inch in diameter, so as to fit on to the ferrule, as before mentioned, on the top of the spindle. This former is made sloping on the top and bottom, or at both ends, and comes nearly at the edge of the bore at both ends. The top part slopes on an angle of about 40 degrees, and the underside at an angle of 50 degrees, so as to fit into the beforementioned slide cup. The largest diameter of the former is 2⅝ inches, and projects vertically down ⅛ of an inch over the sloping part, forming a ring w, making the interior of the vertical portion 2½ inches in diameter. This ring determines the diameter of the cop, and also prevents the roving from flying out over the largest part of the former, when the traverse rod is at its highest point. There is a slit cut in one side of the former ⅛ of an inch wide perpendicularly from the outside into the bore. There is a steel pin part through this former ⅛ of an inch in diameter, within ½ of an inch of the top, nearly opposite to the beforementioned slit in the former. This pin projects into the bore ⅛ of an inch and is made fast in the former.

When the former is placed onto the ferrule on the spindle, the pin slips down in the slit of the ferrule, (that is cut out at the top) until the pin in the former gets to the bottom of the slit. The former is then turned to the right, pitching the pin in the former into the crook in the slit, heretofore mentioned. This places the former substantially on the spindle, and pitches the slit in the former in snug with the slit in the ferrule and spindle. Hence, the former is made fast on the spindle, in similar manner to a bayonet on a common gun. By turning the former forward it can be lifted off, and by slipping it on and turning it it is made fast. This is very necessary, as the former must always be taken off to doff the roving or cop from the cop sheath.

Figure 1 represents the spindle all together and the cup nearly down as filled with roving and with the slits in the spindle, cop sheaths, and former turned opposite to our view, and the pulleys with their hubs down. Fig. 2 represents the spindle all together with the cup near the top of the sheath, and the slits in the spindle, sheath, and former all in sight; and the hubs of the pulleys up. Those two figures show the order in which the pulleys will be placed with one half of the hubs up and the other half down, and lapping by each other about one inch as heretofore described. Fig. 3 is an interior view of the whole, together, and the slide cup nearly down as filled with roving.

To set this machine in operation we in the first place raise up the lifter rail, which rail supports or raises and falls the traverse rings and traverse rods which guide the roving. This rail will be hereinafter described. It has a handle made fast to it, and comes out between the spindles in front of the machine. By this handle the lifter is raised up so that the eye in the traverse rod comes in range with the hole in the side of the spindle near the top. This lifter is thus held up by a catch or latch, which catches under the handle of said lifter. The roving is then placed down into the hole in the center of the traverse rod and brought out of the eye and hole in the side of the spindle at the upper end of the slit and laid into the slit in the former and the end brought under the former on the sloping part. The cup is then slipped up snug to the former and held there by the spring on the hub of the cup. It will be seen that the spindle and former must possess one uniform rotary motion, revolving faster than the cop sheath and slide cup, hence the cop sheath and cup possess an increasing and decreasing motion, corresponding with the greater or smaller part of the former where the roving may be a winding. This motion is produced by cams which will be hereinafter described.

The traverse or lifter rail is made of wood or iron lying horizontally lengthwise of the machine. There are pieces of rolled iron $\frac{1}{16}$ of an inch thick $1\frac{1}{2}$ inches wide, and about 3 inches in length, with one end of said iron screwed fast to the upper side of said spindle rail. There is a hole through the other end of these irons of sufficient size to let the spindles pass through. There is one placed to each spindle. These irons compose a part of the lifter. This lifter is placed just back of the spindles, with the irons projecting forward and the spindles passing through them. The traverse rings before mentioned rest on these lifter irons attached to the lifter rail, which traverse rings and traverse rods is moved vertically up and down by means of said lifter rail. This lifter rail is supported by a straight iron pillar standing perpendicular. It is nearly an inch in diameter, passing through the lifter rail near the center of said rail. The lifter may be placed up or down on this lifter pillar at its proper height and then made fast by a set screw passing through the back side of said lifter rail, and the point bearing against said perpendicular lifter iron or pillar. This lifter iron is supported at the top and bottom by two cast iron boxes one at each end one made fast to the upper the other to the lower spindle rail, and said lifter pillar slides vertically up and down in said boxes. The lower end of said lifter pillar rests or bears onto an iron cam or heart which gives an increase and diminishing motion to the lifter. This must needs be as the diameter of the cap at the largest place of winding is three times as large as the smallest place; hence it will be seen that the lifter must move three times as fast when the roving is winding at the point or smallest part of the cop as what it does at the largest. In this case the periphery of the heart is made or laid out so as to increase the motion of the lifter as the lifter descends from the apex of the heart to the base, and a decreasing motion as it descends from the base to the apex, increasing and decreasing in a ratio of 3 to one. To lay out one of these hearts we in the first place ascertain what length of traverse is required; secondly in what ratio or proportion it is wanted to increase and diminish, therefore, knowing we wish to traverse one inch and $\frac{3}{8}$ of an inch, and in a ratio of three to one, we now draw two circles. The core circle or smallest one will be one inch and $\frac{3}{8}$ of an inch in diameter, the other will be three times as large, making it 4 inches and $\frac{5}{8}$ of an inch. Now from the core circle to the largest circle it is one inch and $\frac{5}{8}$ of an inch, just what we wish to traverse. We next draw a straight line through the center, from one side of the largest circle to the other. We then space on one side of the center and on this straight line from one circle to the other, within the distance of about $\frac{1}{32}$ of an inch and then strike it all into circles from the interior to the exterior circle. Next we commence with the dividers on the inner circle and line which is drawn across, and space from that to the next outer circle, and from that to the next outer circle, and so on through until we arrive at the largest circle on the opposite side from whence we started. We then return on the opposite side until we arrive at the place where we started, the impression being made on the circles by the dividers. We then mark from one impression to another, and from that to the next and so on through. This will give a traverse heart that will traverse three times as fast at the apex as it will at the base; now it will be seen that this is not what we want, we want a heart that will traverse the lifter three times as fast at the base as what it does at the apex. We now proceed and reverse the proportion or laying out of the heart, and bring the apex in place of the base, and the base in place of the apex; to do this we draw lines from the center out to the largest circle, marking directly over or on, the spaces or impression made by the dividers before mentioned. This being done we begin to mark for the apex on the opposite side from which it was before and mark to the next inner circle where the line crosses, from there to the next inner circle where the next line crosses, and so on around until we get to the opposite side on the core circle; then return back on the opposite side to the place where we started. This being done the heart is completed and will give the motion required. This heart may also be enlarged after thus being laid out by adding new circles on the outside of the other circles, and must be placed the same distance apart that the first circles were, and extend the cross lines out also to the largest made circle; in this way it can be made to any required size. It will be recollected that this heart is used to traverse the lifter or traverse rods which guide the rovings. This heart is thus made fast to a shaft, and said heart is placed directly under the before mentioned lifter pillar. This heart shaft is like unto the one in the Bennington speeder, of which there is a model in the Patent Office. This shaft is supported by boxes at each end of the shaft and is also driven with a gear by an endless screw in the same manner as that of the Bennington speeder; still there is a difference in the two hearts for the two machines. The heart in the Bennington speeder would give a traverse three times as far at the apex as what it does at the base, this heart was used to traverse the roving tubes.

In the cop speeder the heart gives a traverse three times as fast at the base as what it does at the apex and is made to traverse the traverse rods. The spindles and formers are driven one uniform rotary motion, revolving faster than the slide cup and cop sheath, but the sheath and cup is driven an increase and decreasing motion, as often as the rover is traversed up and down under the former, the motion of the cup increases and diminishes corresponding with the greater or smaller part of the former where the roving may be winding, this causes the roving to draw or take up alike, whether winding on the small or large part of the former. The spindles and sheaths may have pulleys on them as described and be driven by bands or belts. Gears may also be used, instead of pulleys and belts, (if preferred by the operator.)

In this invention we have used round bands, and driven the spindles and cop sheaths, in similar manner to the flier and spindle in the Bennington speeder, (of which there is a model in the Patent Office, although the motions are reversed.) The top cylinder in the Bennington speeder is the main driving shaft, and the cylinder on said shaft is used to drive the fliers. In this invention it is placed at the bottom and is used to drive the spindles. The under cylinder in the Bennington speeder possesses an increasing and decreasing motion and is used to drive the spindles. In this invention it is used to drive the cop sheath and slide cup. It is the top cylinder and possesses an increase and decreasing motion. This motion is produced by the cones on said cylinders. The cone belt is traversed on this machine by the same heart or wiper, and in the same manner as it is in the Bennington speeder and the effect produced by the cones in this machine is just the same as they are in the Bennington speeder.

This machine when set in motion coils the roving in the cup, and by the vertical motion of the traverse rod the roving is laid spirally up and down under the former and in the cup. The roving presses the cup as it fills and causes the cup to gradually descend or slide down on the cop sheath until it is filled with roving. Thus the cop being formed on the sheath with the cup nearly down, the former is then turned forward and raised off from the spindle; this leaves a hollow or cavity in the top of the cop. There is skewers made of wood about eight inches in length with a sloping head on one end shaped to fit into the cavity of the cop after the former is taken off, the stem of this skewer is $\frac{3}{4}$ and $\frac{1}{16}$ of an inch in diameter with the point a little rounded off in order that the roving may slip onto it with ease when it is doffed from the cop sheath.

There is a hollow or place made dishing in the top of the spindle and ferrule to place the point of said skewer into when in the act of doffing; when we doff we take the skewers by the head, in the right hand, (after the former is taken off,) and place it perpendicularly over the spindle with the point bearing into the hollow in the top of said spindle. We then take hold under the hub of said cup, with the left hand and slip the roving up on to said skewer leaving the hub near the top of the cop sheath, as said hub can rise no farther, but the cup can be raised off from the hub following the roving or cop onto the skewer; the cup is then placed back onto the hub from whence it was taken, the former is placed onto the spindle, the eye threaded as before, and the machine is again ready for operation. This process of doffing is done with great simplicity, also with neatness and despatch.

Now it will be seen that the cop when placed on the skewer is reversed; the point or top is now what was once the bottom, when in the machine on the cop sheath, hence the roving is not spun backward, but is spun the same end forward as what it was made, keeping straight along from the time it enters the drawing rollers of the speeder, until it is made into yarn. This is not the case with the double speeders or any other speeder in common use. This is a very important point, as it is a well known fact by almost every manufacturer of cotton, that the roving when delivered from the drawing rollers on all speeders must run a greater or less distance through the atmosphere before it can be formed into any kind of shape fit for use, and generally passes through some kind of tube, flier, or some other kind of conveyance sufficient to place the roving in a proper form; hence it may be seen by the counteraction of the atmosphere as the roving runs from the drawing rollers, and running through tubes, fliers, or even through the eye of the traverse roll and former in this invention that the external fibers of cotton must all be laid one way, so if the roving is unwound or spun off backward it must rough up the external fibers of cotton and will make more waste in spinning, and the yarn will not be of as fair a quality. For this reason roving should by all means be spun off the same end forward as what it was made.

It will be observed in this invention that there is one distinguishing feature in its operation; that is, the roving as it is delivered from the drawing rollers in the speeder runs immediately to the center of action in the spindle and former; then by the velocity of the spindle and former the air is sent centrifugally through the slit in the former; this causes a current of air to pass down through into the top of the spindle, which tends to help carry the roving vertically through the former and eye of traverse rod; again by the velocity of the former the roving is centrifugally sent to place of coiling under the former and in the cup or cavity of the cop. The roving being thus conducted cannot meet with the least counteraction in the atmosphere after it enters the top of the spindle. Neither does any parts of the spindle meet with any counter-action as every part of the spindle is of a plain surface, it consequently must bear a far greater speed, than any practicable velocity of the double speeders or trumpet speeders in common use.

This machine differs essentially from the last mentioned speeders, especially in the operation. For instance, when the roving leaves the lower end of the roving tube on the trumpet speeder or double speeder, it is taken centripitally to the spool.

By this means the roving has to contend against the centrifugal motion, caused by the velocity of the flier; hence they cannot bear so great a speed, without breaking down the ends.

This machine when set up will be about 4 feet in length, 2 feet wide and 3 feet 6 inches high to the top of the drawing rolls; twelve spindles we think will be the most convenient number for this invention; they are placed in front of the frame, standing perpendicular within three inches and ½ of each other, supported by two rails or girts; the lower girt supports the steps, the upper girt supports the upper part of the spindles by means of the brass collar on said spindle bearing; this brass collar on the spindle, passes through the upper spindle rail, and is made fast by a set screw passing through the back side of said spindle rail and the point bears against the side of said brass collar.

It should have been mentioned there is a hole drilled into the upper sloping part of the former ¾ of an inch in diameter, sufficient to counterbalance the slit in the opposite side of the former.

What we claim as our invention and desire to secure by Letters Patent is—

The combination of the cop sheath and slide cup, also the combination of the traverse rod, spindle and former, and these in combination with the cop sheath and sliding cup, by which the roving is twisted, wound spirally up and down under the former and in the cup or cavity of the cop, and there condensed between the former and sliding cup, all as herein described.

TRUMAN ESTES.
WARREN DUTCHER.

Witnesses:
PAUL BOYNTON,
ELI WORTE.